United States Patent [19]

Moran

[11] 4,417,150
[45] Nov. 22, 1983

[54] OPTICAL SYSTEM FOR DETERMINING PERIPHERAL CHARACTERIZATION AND DIMENSIONS OF A SHEET

[75] Inventor: Raymond D. Moran, Springdale, Pa.

[73] Assignee: PPG Industries, Inc., Pittsburgh, Pa.

[21] Appl. No.: 292,566

[22] Filed: Aug. 13, 1981

[51] Int. Cl.³ .............................................. G01N 21/88
[52] U.S. Cl. ..................................... 250/572; 250/563
[58] Field of Search ................ 250/571, 572, 560, 563; 356/445, 446, 447, 448, 376, 380, 386, 387

[56] References Cited

U.S. PATENT DOCUMENTS

| | | | |
|---|---|---|---|
| 2,220,736 | 11/1940 | Stockbarger et al. | 88/14 |
| 2,662,633 | 12/1953 | Kingsley | 198/33 |
| 3,108,727 | 10/1963 | Farber | 226/23 |
| 3,489,909 | 1/1970 | Martel | 250/219 |
| 3,495,089 | 2/1970 | Brown | 250/219 |
| 3,618,742 | 11/1971 | Blanchard et al. | 198/33 |
| 3,656,854 | 4/1972 | Bricker et al. | 356/119 |
| 3,881,605 | 5/1975 | Grossman | 214/1 |
| 3,890,509 | 6/1975 | Maxey | 250/561 |
| 4,053,234 | 10/1977 | McFarlane | 356/156 |
| 4,105,925 | 8/1978 | Rossol et al. | 250/561 |
| 4,163,173 | 7/1979 | Norling | 313/352 |
| 4,228,886 | 10/1980 | Moran | 198/395 |

FOREIGN PATENT DOCUMENTS

| | | | |
|---|---|---|---|
| 1307664 | 2/1973 | United Kingdom | 271/227 |
| 1322854 | 7/1973 | United Kingdom | 313/271 |

*Primary Examiner*—David C. Nelms
*Assistant Examiner*—Darwin R. Hostetter
*Attorney, Agent, or Firm*—William D. West; Donald Carl Lepiane

[57] ABSTRACT

A plurality of lights are mounted relative to one another to direct light beams toward a glass sheet along continuous scan portions. The sheet moves through the scan portions to reflect light beams toward a linear array of diodes. The linear array of diodes is activated and deactivated to simulate a discrete scan path and to generate points of intersection between the edge portions of the glass sheet and the scan path. The signals of the photodetectors are acted on to determine peripheral characteristics of the sheet such as squareness of the corners, linearity of the sheet sides and length of each sheet side.

17 Claims, 3 Drawing Figures

OPTICAL SYSTEM FOR DETERMINING PERIPHERAL CHARACTERIZATION AND DIMENSIONS OF A SHEET

FIELD OF THE INVENTION

This invention relates to an optical system for determining physical characteristics of a sheet, e.g. a glass sheet.

DISCUSSION OF THE PRESENT TECHNOLOGY

Optical systems such as those taught in U.S. Pat. No. 4,228,886, have light generators and photodetectors for determining orientation of an article, e.g., orientation of a glass sheet prior to handling the sheet by an industrial robot. Other optical systems for determining orientation of articles are taught in U.S. Pat. Nos. 3,618,742; 3,881,605; 4,105,925 and 4,163,173 and British Nos. 1,307,664 and 1,322,854. Optical systems are also used to determine the configuration of cants to maximize the number of commercial size pieces of lumber that may be cut from the cants. Such a system is taught in U.S. Pat. No. 3,890,509.

Although there are optical systems for determining orientation and configuration of articles, e.g., as noted above, they have not been fully developed as an instrument for determining peripheral characteristics and dimensions of articles, e.g., glass sheets. It would be advantageous, therefore, to provide such an optical system.

SUMMARY OF THE INVENTION

This invention relates to a method of determining peripheral characteristics of a discrete sheet having a reflective surface, for example, determining corner squareness of a glass sheet, and linearity and length of the sides. In general, the method is practiced by directing energy beams toward a surace of the sheet to provide a scan path extending beyond the side of the sheet. The scan path and sheet are moved relative to one another to reflect energy beams from the surface of the sheet toward sensing facilities, for example, a linear array of photodiodes. The sensing facilities are selectively operated to generate a signal which simulates discrete spaced scan paths to provide points of intersection between the sides of the sheets and each scan path. For example, a timer energizes and de-energizes the photodiode array. When the photodiode is de-energized, no data is transmitted, and when the photodiode is energized, data having intersection points along a scan path is generated. The intersection points and scan paths are acted on to determine peripheral characteristics of the sheet.

This invention further relates to an apparatus for determining peripheral characteristics of the sheet and includes facilities for directing at least one energy beam toward an inspection position to generate a scan path and facilities for moving the scan path and the sheets to be inspected or studied relative to one another. Sensing facilities response to beams reflected from the surface of the glass sheet and acted on by timing facilities, generate data which simulates a scan path and intersection points between the scan path and sides of the sheet to be studied. Thereafter, the data from the sensing facilities is acted on to provide peripheral characteristics of the sheet.

DETAILED DESCRIPTION OF THE INVENTION

Figure 1:
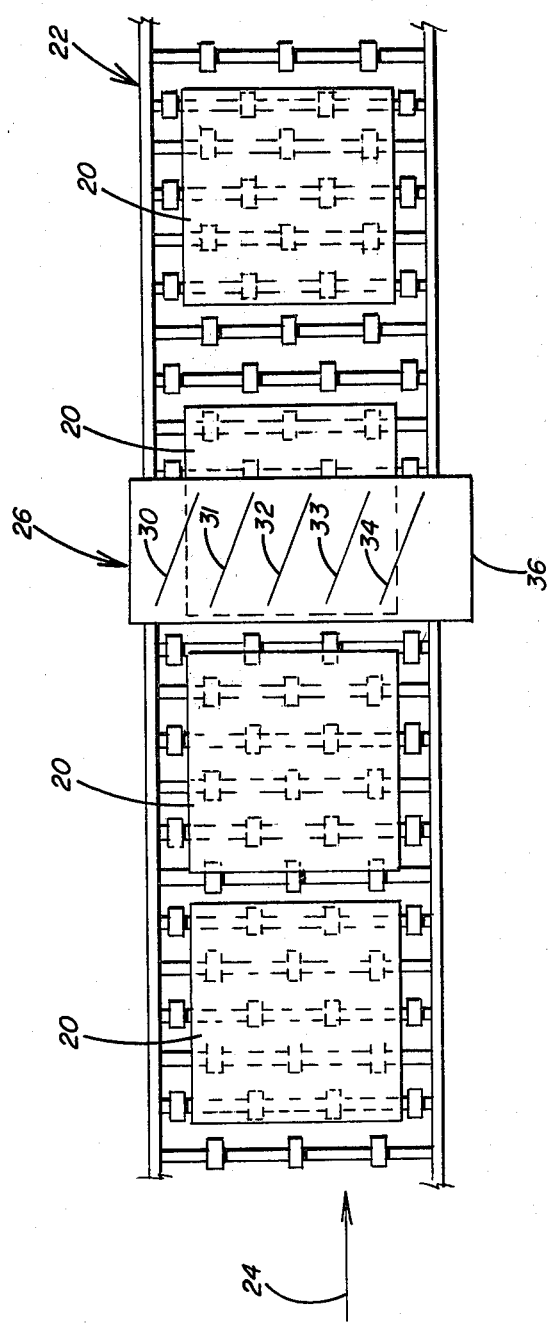
FIG. 1 is a plan view of a sheet conveying system having an inspection station incorporating features of the invention for determining peripheral characteristics of sheets.

With reference to FIG. 1, glass sheets 20 are advanced by conveyor 22 in the direction of the arrow 24 through inspection station 26 incorporating features of the invention. The sheets 20, as they pass through the inspection station, are scanned and the information generated is acted on in a manner to be discussed below to determine peripheral characteristics, e.g., configuration and dimensions of the sheets. A plurality of sensors 30–34 are mounted in housing 36 conveniently supported above the movement path 24. The housing 36 is not limiting to the invention and is used to support the sensors 30–34 and to prevent room lighting from affecting the sensors. The sensors 30–34 are similar to those taught in U.S. Pat. No. 4,228,886, which teachings are hereby incorporated by reference.

Figure 2:
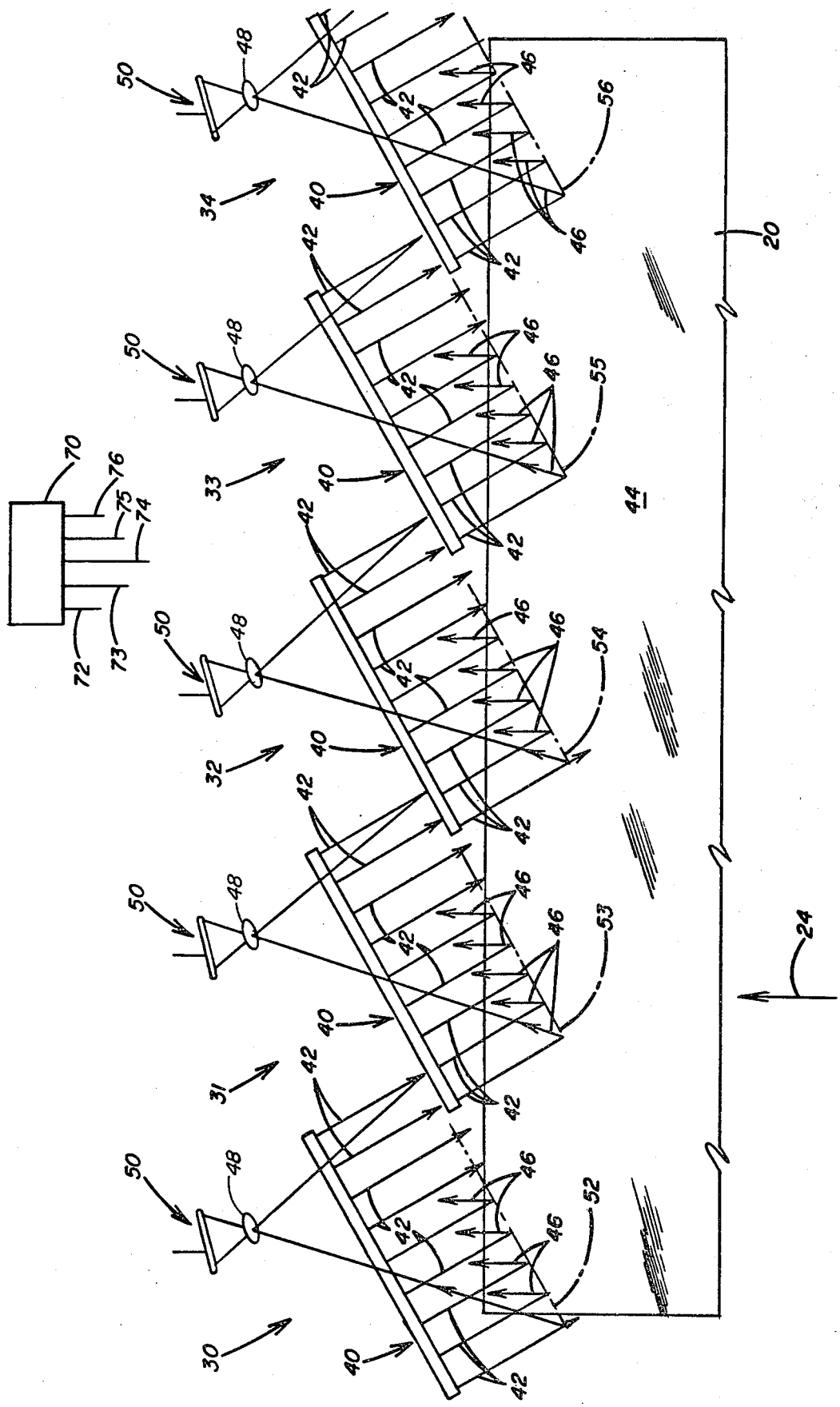
FIG. 2 is a plan view of the inspection station incorporating features of the invention and having portions removed for purposes of clarity illustrating the relative position of light generating facilities, photodetectors, and a sheet.

With reference to FIG. 2, the sensors 30–34 are identical in construction and the discussion will, therefore, be directed to the sensor 30 with the understanding that the discussion is applicable to the sensors 31–34 unless indicated otherwise. The sensor 30 includes an energy source 40, e.g., a light source such as a converging light source, a diverging light source, or a moveable light source. In the practice of the invention, a 20 watt cool white fluorescent tube No. F20T62-CW1 is used to direct uniform diffused light rays or beams 42 toward the sheet movement path 24. When a portion of a sheet 20 intercepts the light beams 42, a portion of the light beams 42 is reflected from the sheet surface 44 as reflected light rays or beams 46. The reflected light rays 46 pass through a lens 48 and are incident on light sensor 50. In the practice of the invention, the lens 48 is a 35–105 millimeter 3.5 automatic fix mounted zoom lens and the light sensor 50 is a Reticon Corp. Model RL-1024G-RC-106 linear array photodetector having more than about 1,000 closely adjacent discrete photodetectors.

The length of the fluorescent tubes 40, the position of the lenses 48 and of the photodetectors 50 relative to one another and to the horizontal supporting surface of the conveyor 22 are selected to define the length of a scan portion 52–56 for the sensors 30–34, respectively. For example, in the practice of the invention, the tubes 40 are each about 22 inches (55.8 centimeters) long and spaced about 12 inches (30.4 centimeters) from the supporting surface of the conveyor 22. The lens 48 is adjusted such that the field of view for each of the scan portions 52–56 at the surface of the conveyor 22 is about 14.14 inches (35.9 centimeters) long per 1,000 photodiodes of the light sensor 50. Further, the tubes 40 of the sensors 30–34 are arranged so that the scan portions 52–56 are identically skewed from a line normal to the path 24 to maximize the number of intersection points of the leading and trailing edge of the sheet 20 which are usually normal to the path 24. Although not limiting to the invention, the intention is practiced with the skew angle at 45° which provides sufficient intersection points to adequately determine peripheral characteristics of the sheet.

Figure 3:
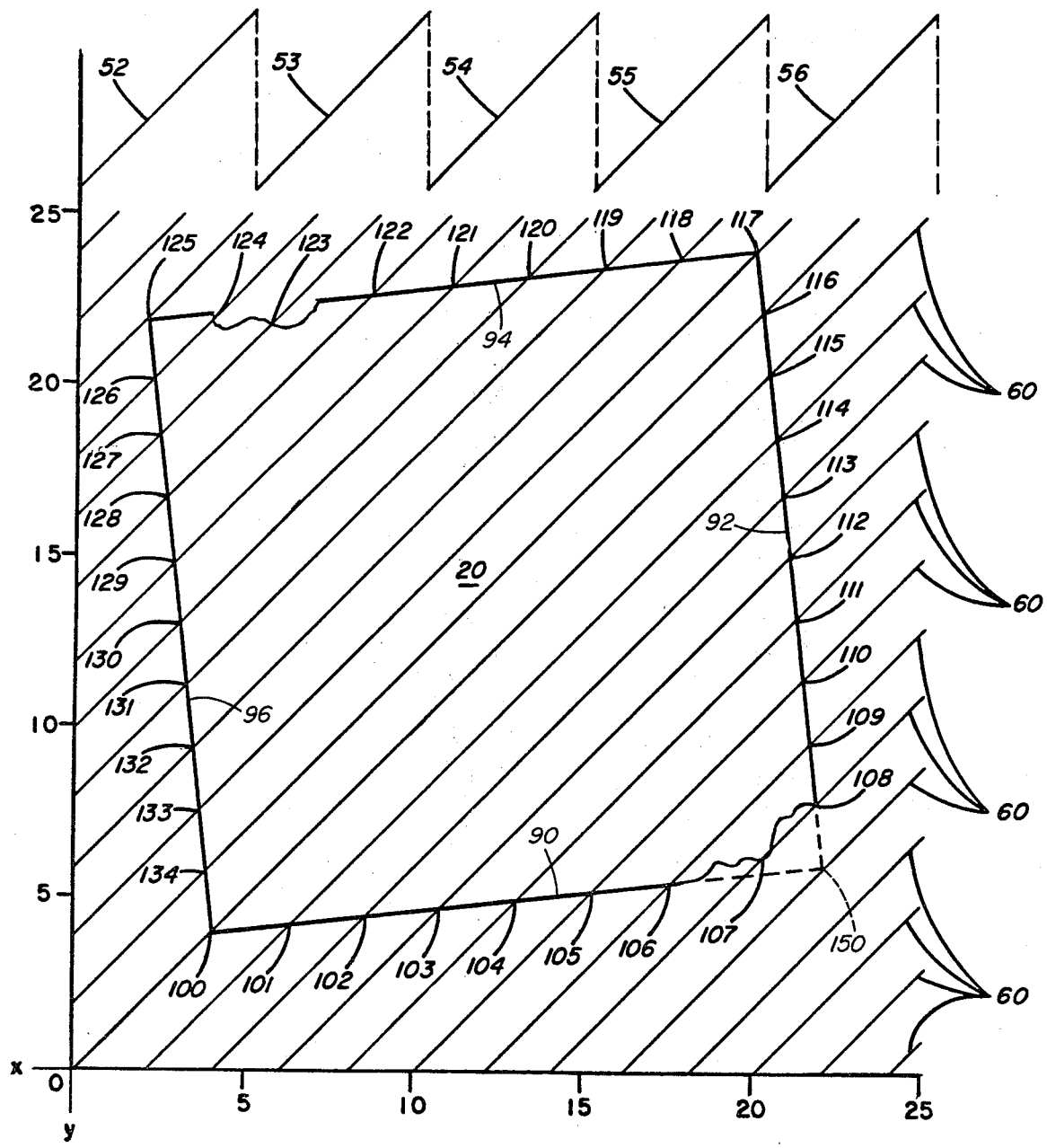
FIG. 3 illustrates a sheet intersecting discrete scan paths and their relationship by x-y co-ordinates.

With reference to FIGS. 2 and 3, the light sensor 50 and its respective light source 40 of each sensor 30-34 are arranged so that the upstream end of a scan portion is aligned with the downstream end of an adjacent scan portion. This creates an off-set between adjacent sensors 30-34 but enables mounting of the sensors in a compact line across the conveyor. The off-set is compensated for by storing and thereafter selectively retrieving the intersection points on a discrete continuous scan path.

As a sheet 22 passes through the inspection station, the light rays 42 of the sensors 30-34 impinge on the glass surface and are reflected back to actuate appropriate photodetectors of the light sensor 50. A controller 70 shown in FIG. 2 is connected by cables 72-76 to the light sensors 50 of the sensors 30-34 respectively to selectively actuate and deactuate the light sensors 50 and to record the intensity of the light sensed by each of the photodetectors of the light sensors 48. In this manner, intersection points between the sides of the sheet which include the leading and trailing edge of the sheet, and the scan path 60 can be generated, e.g., intersection points 100-134 for the sheet 20 shown in FIG. 3. Knowing the conveying speed of the sheet 22 and the cycle time for actuating and de-actuating the light sensors 50, the intersection points can be identified on x-y co-ordinates. Although not limiting to the invention, it is recommended that the scan paths 60 be spaced about 0.040 inch (0.102 centimeters) from one another. For example, if a sheet is advancing at a speed of about 100 feet (30 meters) per minute, the photodetectors are energized and de-energized at intervals of about $3.3 \times 10^{-5}$ minutes. In FIG. 3, the scan paths are spaced about 2 inches (5.08 centimeters) apart for simplicity of discussing the invention. In addition, FIG. 3 shows a plurality of paths 60 when, in fact, there is only one scan path through which the sheet passes. Further, the outline of the glass sheet 22 shown in FIG. 3 is presented merely for illustration purposes, and it should be understood that the following example of the invention is for ease of discussion and may not necessarily be data generated in the practice of the invention.

The sheet 20 in FIG. 3 has sides 90, 92, 94 and 96 which intersect the scan paths 60 at points 100-134. TABLE I lists the x co-ordinate and the y co-ordinate of each intersection point.

TABLE I

| | INTERSECTION OF SHEET SIDE AND SCAN PATH | | |
|---|---|---|---|
| Sheet Side | Intersection Point of Scan Path and Side | x Co-ordinate at Intersection Point | y Co-ordinate at Intersection Point |
| 90 | 100 | 4.000 | 4.000 |
| | 101 | 6.250 | 4.250 |
| | 102 | 8.500 | 4.500 |
| | 103 | 10.750 | 4.750 |
| | 104 | 13.000 | 5.000 |
| | 105 | 15.250 | 5.250 |
| | 106 | 17.500 | 5.500 |
| | 107 | 20.250 | 6.500 |
| | 108 | 21.800 | 7.800 |
| 92 | 108 | 21.800 | 7.800 |
| | 109 | 21.600 | 9.600 |
| | 110 | 21.400 | 11.400 |

TABLE I-continued

| | INTERSECTION OF SHEET SIDE AND SCAN PATH | | |
|---|---|---|---|
| Sheet Side | Intersection Point of Scan Path and Side | x Co-ordinate at Intersection Point | y Co-ordinate at Intersection Point |
| | 111 | 21.200 | 13.200 |
| | 112 | 21.000 | 15.000 |
| | 113 | 20.800 | 16.800 |
| | 114 | 20.600 | 18.600 |
| | 115 | 20.400 | 20.400 |
| | 116 | 20.200 | 22.200 |
| | 117 | 20.000 | 24.000 |
| 94 | 117 | 20.000 | 24.000 |
| | 118 | 17.750 | 23.750 |
| | 119 | 15.500 | 23.500 |
| | 120 | 13.250 | 23.250 |
| | 121 | 11.000 | 23.000 |
| | 122 | 8.750 | 22.750 |
| | 123 | 5.750 | 21.750 |
| | 124 | 4.000 | 22.000 |
| | 125 | 2.000 | 22.000 |
| 96 | 125 | 2.000 | 22.000 |
| | 126 | 2.200 | 20.000 |
| | 127 | 2.400 | 18.400 |
| | 128 | 2.600 | 16.600 |
| | 129 | 2.800 | 14.800 |
| | 130 | 3.000 | 13.000 |
| | 131 | 3.200 | 11.200 |
| | 132 | 3.400 | 9.400 |
| | 133 | 3.600 | 7.600 |
| | 134 | 3.800 | 5.800 |
| | 100 | 4.000 | 4.000 |

The slope of the sides 90 and 94 relative to the x co-ordinate is determined by Equation 1 and the slope of the sides 92 and 96 relative to the y co-ordinate is determined by Equation 2.

$$M_{90 \text{ or } 94} = \frac{NE_{xy} - E_x E_y}{NE_x^2 - (E_x)^2} \qquad \text{Equation 1}$$

$$M_{92 \text{ or } 96} = \frac{NE_{xy} - E_x E_y}{NE_y^2 - (E_y)^2} \qquad \text{Equation 2}$$

Where:

M is the slope of the sheet side;

N is the number of co-ordinate points considered;

$E_{xy}$ is the sum of the product of the x and y co-ordinate values of the points N for the side under consideration;

$E_x$ is the sum of the x co-ordinate values of the points N for the side under consideration; and $E_y$ is the sum of the y co-ordinate values of the points N for the side under consideration.

The number of points selected to determine the slope of the side is not limiting to the invention, however, it is recommended that the number of points selected give a representation of the expected configuration of the side. For example, as shown in FIG. 3, the expected configuration of a side is a straight line. Therefore, it is recommended that at least two points be selected from the central portion of the side because at least two points are needed to locate a straight line and there is less likelihood that the central portion of the side will be damaged during handling. Shown in TABLE II is the slope of each sheet side and pertinent data used in the calculation of the slope.

TABLE II

DATA AND SLOPE OF THE SHEET SIDES

| Sheet Side | Intersection Points | x Co-ordinate | y Co-ordinate | Equation Used | Slope |
|---|---|---|---|---|---|
| 90 | 103 | 10.750 | 4.750 | 1 | 1/9 |
|  | 104 | 13.000 | 5.000 |  |  |
|  | 105 | 15.250 | 5.250 |  |  |
| 92 | 111 | 21.200 | 13.200 | 2 | −1/9 |
|  | 112 | 21.000 | 15.000 |  |  |
|  | 113 | 20.800 | 16.800 |  |  |
|  | 114 | 20.600 | 18.600 |  |  |
| 94 | 120 | 13.250 | 23.250 | 1 | 1/9 |
|  | 121 | 11.000 | 23.000 |  |  |
|  | 122 | 8.750 | 22.750 |  |  |
| 96 | 128 | 2.600 | 16.600 | 2 | −1/9 |
|  | 129 | 2.800 | 14.800 |  |  |
|  | 130 | 3.000 | 13.000 |  |  |
|  | 131 | 3.200 | 11.200 |  |  |

The slope as determined from Equations 1 and 2 may not be the actual slope of the side, but is the best fitted slope for the points selected for the calculation. Therefore a determination may be made, if desired, by selecting additional points and comparing the slope calculated with these additional ponts to those calculated using the first initial points. If the slope remains the same, there is confidence that the slope determined is the actual slope of the side relative to adjacent x or y co-ordinates.

The slope of the sides 90, 92, 94 and 96 give an initial relationship of the sides assuming that the calculated slopes are the actual slopes. For example, if the value and the sign for sides 90 and 94 are equal and the same, then the sides 90 and 94 are parallel to one another. The same relationship is true for sides 92 and 96. If the slope of the sides 90, 92, 94 and 96 are equal and the sign of the slope for sides 92 and 96 are opposite to the sign of the sides 90 and 94, then the sides are parallel and normal to one another.

Although not limiting to the invention, the intercept of a sheet side 90, 92, 94, or 96 and adjacent x or y axis is determined in accordance with a respective one of Equation 3 or 4:

$$I_{90 \text{ or } 94} = \frac{E_y - M_{90 \text{ or } 94} E_x}{N} \quad \text{Equation 3}$$

$$I_{92 \text{ or } 96} = \frac{E_x - M_{92 \text{ or } 96} E_y}{N} \quad \text{Equation 4}$$

Where:

$I_{90 \text{ or } 94}$ is the intercept point value of the extended side 90 or 94 with adjacent y axis;

$I_{92 \text{ or } 96}$ is the intercept point value of the extended side 92 or 96 with adjacent x axis;

$M_{90 \text{ or } 94}$ and $M_{92 \text{ or } 94}$ is the slope determined from Equation 1 or 2 of the sheet side under consideration for the determination of the intercept; and N, $E_y$ and $E_x$ are as previously defined.

From Equation 3 it is determined that extending the side 90 would intercept the y axis at 3.556; from Equation 4 it is determined that extending side 92 would intercept the x axis at 22.667; from Equation 3 it is determined that extending side 94 would intercept the y axis at 21.778; and from Equation 4 it is determined that extending the side 96 would intercept the x axis at 4.444.

The intercept point values and the slope of the sides calculated using Equation 1, 2, 3 or 4 are used in following Equations 5 and 6 to determine the expected x and y co-ordinates for each corner point of the sheet and thereafter following Equations 7 and 8 are used to determine the length of each side. In the following discussion, the corners of the glass sheet 20 as shown in FIG. 3 are defined for purposes of the following discussion by numeral 100 which is the intersection of sides 90 and 96; by numeral 150 which would be the intersection of lines 92 and 90 if the sides were continuous; by numeral 17 which is the intersection of sides 92 and 94; and by numeral 125 which is the intersection of sides 94 and 96.

$$P_y = \frac{M_a I_a + I_b}{1 - M_a M_b} \quad \text{Equation 5}$$

$$P_x = M_b P_y + I_a \quad \text{Equation 6}$$

Where:

$P_y$ is the y co-ordinate for the corner under consideration; and $P_x$ is the x co-ordinate for the corner under consideration;

for determining x-y co-ordinates for corner 100

$M_a$ is the slope of side 90 determined from Equation 1;

$M_b$ is the slope for side 96 determined from Equation 2;

$I_a$ is the y axis intercept point value for side 96; and $I_b$ is the x axis intercept point value for side 90;

for determining x-y co-ordinates for the corner 150

$M_a$ is the slope of the side 90 determined from Equation 1;

$M_b$ is the slope of side 92 determined from Equation 2;

$I_a$ is the x axis intercept point value for the side 92; and $I_b$ is the y axis intercept point value for the side 90;

for determining the x-y co-ordinates for the corner 117

$M_a$ is the slope of the side 94 determined from Equation 1;

$M_b$ is the slope of the side 92 determined from Equation 2;

$I_a$ is the x axis intercept point value for the side 92; and $I_b$ is the y axis intercept point value for the side 94;

for determining x-y co-ordinates of the corner 125

$M_a$ is the slope of the side 94 determined from Equation 1;

$M_b$ is the slope of the side 96 determined from Equation 2;

$I_a$ is the x axis intercept point value for the side 96; and $I_b$ is the y axis intercept point value for the side 94.

Using Equations 5 and 6, the x-y co-ordinates of expected corner 100 is 4, 4; of expected corner 150 is 22, 6; of expected corner 116 is 20, 24; and of expected corner 125 is 2, 22.

The length of sides 90 and 94 are determined from Equation 7 and of sides 92 and 96 from Equation 8.

$$L_{90 \text{ or } 94} = \frac{X_a + M_a y_a - [x_b + M_a y_b]}{[1 + (M_a)^2]^{0.5}} \quad \text{Equation 7}$$

$$L_{92 \text{ or } 96} = \frac{y_a + M_a x_a - [y_b + M_a x_b]}{[1 + (M_a)^2]^{0.5}} \quad \text{Equation 8}$$

Where:

$L_{90 \text{ or } 94}$ and $L_{92 \text{ or } 96}$ is the length of the side under consideration;

for the side 90 using Equation 7:
- $x_a$ is the x co-ordinate value for the expected corner 150;
- $y_a$ is the y co-ordinate value for the expected corner 150;
- $M_a$ is the slope of the side 90 determined from Equation 1;
- $x_b$ is the x co-ordinate value for the expected corner 100; and
- $y_b$ is the y co-ordinate value for the expected corner 100;

for the side 92 using Equation 8:
- $x_a$ is the x co-ordinate value for the expected corner 117;
- $y_a$ is the y co-ordinate value for the expected corner 117;
- $M_a$ is the slope of the side 92 determined from Equation 2;
- $x_b$ is the x co-ordinate value of the expected corner 150; and
- $y_b$ is the y co-ordinate for the value of the expected corner 150;

for the side 94 using Equation 7:
- $x_a$ is the x co-ordinate value for the expected corner 117;
- $y_a$ is the y co-ordinate value for the expected corner 117;
- $M_a$ is the slope of the side 94 determined from Equation 1;
- $x_b$ is the x co-ordinate value for the expected corner 125; and
- $y_b$ is the y co-ordinate value for the expected corner 125;

for the side 96 using Equation 8:
- $x_a$ is the x co-ordinate value for the expected corner 125;
- $y_a$ is the y co-ordinate value for the expected corner 125;
- $M_a$ is the slope of the side 96 determined from Equation 2;
- $x_b$ is the x co-ordinate value for the expected corner 100; and
- $y_b$ is the y co-ordinate value for the expected corner 100.

Using Equation 7 or 8, as required, the length for each of the sides 90, 92, 94 and 96 is 18.11 inches (46 centimeters). As can now be appreciated, this is the expected length of each side assuming that each side is continuous and does not have chips, e.g., as shown for side 94, nor a corner missing, e.g., as shown for sides 92 and 90 in FIG. 3.

In the following discussion, a reference line for each side is determined using following Equation 9 and thereafter deviation of each intersection point from the reference line is determined using either following Equation 10 or 11 to determine the linearity of each side of the sheet. In this regard, as the sheet advances along the path 24, it is skewed as shown for the sheet 20 in FIG. 3. For ease of determining linearity of a parallelpiped sheet, it is recommended that the leading and trailing edge of the sheet be set normal to the path and the remaining sides parallel to the path. For sheet 20, this is accomplished by rotating the sheet clockwise as viewed in FIG. 2 until the sides 90 and 94 are normal to the path, i.e., parallel to the x axis of the sides 92 and 96 are parallel to the path, i.e., parallel to the y axis. Thereafter, the sides 90, 92, 94 and 96 are extended to intercept the x or y axis to provide a rotational intercept point value determined by Equation 9 which defines a straight line parallel to adjacent one of the x or y axis. Thereafter, Equations 10 and 11 are used to determine deviation of each intersection point from the reference line.

$$I'_a = \frac{I_a}{[1 + (M_a)^2]^{0.5}} \qquad \text{Equation 9}$$

Where:
- $I'_a$ is the rotational intercept value of the x or y co-ordinate of the side under consideration;
- $I_a$ is the intercept point value of the side under consideration determined from either Equation 3 or 4; and
- $M_a$ is the slope of the side under consideration determined from either Equation 1 or 2.

Using Equation 9, the reference value for the side 90 is a y co-ordinate value of 3.534; for the side 92 is an x co-ordinate value of 22.530; for the side 94 is a y co-ordinate value of 21.645; and for the side 96 is an x co-ordinate value of 4.417.

$$Y' = \frac{y - M_{90 \text{ or } 94} x}{[1 + M_{90 \text{ or } 94}^2]^{0.5}} \qquad \text{Equation 10}$$

$$X' = \frac{x - M_{92 \text{ or } 96} y}{[1 + M_{92 \text{ or } 96}^2]^{0.5}} \qquad \text{Equation 11}$$

Where:
- $Y'$ is the calculated rotated y value for intersection points of the side 90 or 94 under consideration;
- $X'$ is the calculated rotated x value for intersection points of the side 92 or 96 under consideration;
- y is the co-ordinate value for the intersection point of the side under consideration;
- x is the x co-ordinate value for the intersection point for the side under consideration; and
- $M_{90 \text{ or } 94}$ and $M_{92 \text{ or } 96}$ is the slope of the side under consideration determined from Equations 1 or 2.

TABLE IV is developed using Equations 9–11. A study of TABLE IV shows that intersection points 107 and 108 of the side 90 and intersection point 107 for the side 92, do not fall on the reference line which indicates that the sides 90 and 92 at the points 107 and 108 has a flare or is chipped. The deviation of the intersection points 107 and 108 for the side 90 are negative, indicating that the intersection points, when the sheet is rotated, fall short of the reference intercept value indicating a chip. The intersection point 107 for side 92 is positive, indicating that rotating the side 92 clockwise about the point 117 was insufficient for the intersection point 107 for the side 92 to fall on the reference line further supporting the position that there is a chip at the corner of the intersection of sides 92 and 94. The points 107 and 108 were studied for both the sides 90 and 92, because the initial study of points 107 and 108 for side 92 showed a deviation and a further study of the points for the adjacent side 92 was required to determine the nature of the deviation. With sufficient scan lines spaced closer together, the actual dimension and configuration of the corner chip can be determined.

A study of the value for the side 94 indicates that points 123 and 124 are different than the reference line or rotational intercept value and that the corner 125 is the same. This indicates that the defect is between the corners. Since the value of difference for points 123 and 124 is a positive sign, it indicates that rotating the side 94 clockwise as viewed in FIG. 3 was short of the intercept points 123 and 124 and therefore, the defect is a chip.

TABLE IV

CALCULATED DEVIATION OF SHEET SIDE FROM REFERENCE LINE

| Sheet Side | Intersection Point | $I'_a$ Calculated Using Equation 9 | Y' Calculated Using Equation 10 | X' Calculated Using Equation 11 | Deviation of Intersection Points $I_a$ - X' or Y' |
|---|---|---|---|---|---|
| 90 | 100 | 3.534 | 3.534 | | 0 |
| | 101 | 3.534 | 3.534 | | 0 |
| | 102 | 3.534 | 3.534 | | 0 |
| | 103 | 3.534 | 3.534 | | 0 |
| | 104 | 3.534 | 3.534 | | 0 |
| | 105 | 3.534 | 3.534 | | 0 |
| | 106 | 3.534 | 3.534 | | 0 |
| | 107 | 3.534 | 4.224 | | −0.690 |
| | 108 | 3.534 | 5.345 | | −1.811 |
| 92 | 107 | 22.530 | | 20.845 | 1.685 |
| | 108 | 22.530 | | 22.530 | 0 |
| | 109 | 22.530 | | 22.550 | 0 |
| | 110 | 22.530 | | 22.530 | 0 |
| | 111 | 22.530 | | 22.530 | 0 |
| | 112 | 22.530 | | 22.530 | 0 |
| | 113 | 22.530 | | 22.530 | 0 |
| | 114 | 22.530 | | 22.530 | 0 |
| | 115 | 22.530 | | 22.530 | 0 |
| | 116 | 22.530 | | 22.530 | 0 |
| | 117 | 22.530 | | 22.530 | 0 |
| 94 | 118 | 21.646 | 21.646 | | 0 |
| | 119 | 21.646 | 21.646 | | 0 |
| | 120 | 21.646 | 21.646 | | 0 |
| | 121 | 21.646 | 21.646 | | 0 |
| | 122 | 21.646 | 21.646 | | 0 |
| | 123 | 21.646 | 20.983 | | 0.663 |
| | 124 | 21.646 | 20.933 | | 0.613 |
| | 125 | 21.646 | 21.646 | | 0 |
| 96 | 125 | 4.417 | | 4.417 | 0 |
| | 126 | 4.417 | | 4.417 | 0 |
| | 127 | 4.417 | | 4.417 | 0 |
| | 128 | 4.417 | | 4.417 | 0 |
| | 129 | 4.417 | | 4.417 | 0 |
| | 130 | 4.417 | | 4.417 | 0 |
| | 131 | 4.417 | | 4.417 | 0 |
| | 132 | 4.417 | | 4.417 | 0 |
| | 133 | 4.417 | | 4.417 | 0 |
| | 134 | 4.417 | | 4.417 | 0 |
| | 100 | 4.417 | | 4.417 | 0 |

TABLE IV shows that the values for the side 96 fall on the reference line or rotational intercept value and therefore the side 96 is linear.

As can be appreciated, the above example is illustrative of a sheet having linear sides, however, if the sheet was circular, a circular reference line would have to be generated. Further, as can now be appreciated a certain tolerance from the reference line is allowable. In the following examples, the construction of the sheet and the defects were selected for ease of discussion and understanding, however in general, a deviation in the amount of about ±1/16 inch (1.59 centimeters) would usually be an acceptable deviation or difference.

The squareness of each corner is determined from following Equation 12.

$$S = \frac{M_a + M_b}{1 - M_a M_b} \quad \text{Equation 12}$$

Where:

S indicates deviation from a 90° angle for corner 100:

$M_a$ is the slope of side 90 determined from Equation 1; and $M_b$ is the slope of side 96 determined from Equation 2;

for corner 150:

$M_a$ is the slope of side 92 determined from Equation 2; and $M_b$ is the slope of side 90 determined from Equation 1;

for corner 117:

$M_a$ is the slope of side 94 determined from Equation 1; and $M_b$ is the slope of side 96 determined from Equation 2; and for corner 125:

$M_a$ is the slope of side 96 determined from Equation 2; and $M_b$ is the slope of side 90 determined from Equation 1.

S for corners 100; 117; and 125 is 0 indicating that the corners are square. Corner 150 was eliminated because it was shown to be chipped.

As can know be appreciated, the above examples are presented for illustration purposes only and the invention is not limited thereto. More particularly, the equations presented were those used in the practice of the invention and other equations may be developed to gather similar information as to similar parameters. Further, the invention is not limited to the configuration of the sheet and may be practiced on sheets having a parallelpiped shape, trapazoidal shape or non-linear shapes.

Further, as can be appreciated, the sensors 30–34 may be mounted, e.g., with the light source 40 on one side of the path 24 and the detector on the other side. In this instance, the light blocked from the detector indicates the major surface of the sheet and the light incident on the detector indicates the absence of the sheet to generate intersection points. In addition, the sensors can be used to locate light absorbing markings, e.g., black tape and the configuration thereof to indicate subsequent disposal of acceptable sheets.

What is claimed is:

1. A method of determining peripheral edge characteristics of a discrete sheet comprising steps of:
    directing energy beams toward a surface of the sheet to provide a scan path, the scan path extending beyond edge portions of the sheet;
    moving the scan path and sheet relative to one another to direct energy beams indicating edge portions of the sheet toward sensing means;
    generating by way of the sensing means, a plurality of discrete signals as a function of intersection between edge portions of the sheet and the scan path defined as intersection points; and
    acting on the generated signals to determine peripheral edge characteristics of the sheet.

2. The method as set forth in claim 1 wherein the sheet has a reflective surface and the energy beams are reflected from the surface along a scan path as reflected energy beams which are incident on the sensing means to generate the signals.

3. The method as set forth in claim 1 wherein the energy beams are directed toward a major surface of the sheet and the beams, unobstructed by the sheet, are incident on the sensing means.

4. The method as set forth in claim 1, 2 or 3 wherein said directing step is practiced by providing a plurality of light generating means positioned relative to one another to provide a scan path on the surface of the sheet.

5. The method as set forth in claim 4 wherein the energy beams are light beams and the sensing means includes discrete linear array of photodetectors and said generating step is practiced by:

energizing and de-energizing sensing means at selected intervals to generate the discrete signals which simulate the intersection points.

6. The method as set forth in claim 5, wherein the sheet moves along a movement path and the scan path at the surface of the sheet is at an oblique angle to the movement path.

7. The method as set forth in claim 2 wherein the sheet has an expected parallelpiped shape having a first pair of opposed sides and a second pair of opposed sides.

8. The method as set forth in claim 7 wherein said acting step includes the steps of determining the slope of each of the first pair of opposed sides relative to a first linear line and determining the slope of each of the second pair of opposed sides relative to a second linear line wherein the first line and second line are perpendicular to one another.

9. The method as set forth in claim 7 wherein said acting step includes the step of determining the length of each side of the sheet.

10. The method as set forth in claim 7 wherein said acting step includes the step of determining the squareness of each corner of the sheet.

11. The method as set forth in claim 5 wherein said acting step includes the step of determining the linearity of each side of the sheet.

12. The method as set forth in claim 8 wherein the first pair of opposed sides are defined as 90 and 94 and the second pair of opposed sides are defined as 92 and 96 and the first line is an x axis and the second line is a y axis, and said acting step includes the steps of:

determining the slopes of the sides 90 and 94 relative to the x axis by following Equation 1 and the slope of the sides 92 and 96 relative to the y axis by following Equation 2;

$$M_{90 \text{ or } 94} = \frac{NE_{xy} - E_x E_y}{NE_x^2 - (E_x)^2} \quad \text{Equation 1}$$

$$M_{92 \text{ or } 96} = \frac{NE_{xy} - E_x E_y}{NE_y^2 - (E_y)^2} \quad \text{Equation 2}$$

determining the intercept of a side of the sheet with ajacent x or y axis according to respective one of following Equations 3 or 4;

$$I_{90 \text{ or } 94} = \frac{E_y - M_{90 \text{ or } 94} E_x}{N} \quad \text{Equation 3}$$

$$I_{92 \text{ or } 96} = \frac{E_x - M_{92 \text{ or } 96} E_y}{N} \quad \text{Equation 4}$$

determining the length of each side (L) according to following Equations 5, 6, 7 and 8;

$$P_y = \frac{M_a I_a + I_b}{1 - M_a M_b} \quad \text{Equation 5}$$

$$P_x = M_b P_y + I_b \quad \text{Equation 6}$$

$$L_{90 \text{ or } 94} = \frac{x_a + M_a y_a - [x_b + M_a y_b]}{[1 + (M_a)^2]^{0.5}} \quad \text{Equation 7}$$

$$L_{92 \text{ or } 96} = \frac{y_a + M_a x_a - [y_b + M_a x_b]}{[1 + (M_a)^2]^{0.5}} \quad \text{Equation 8}$$

determining the linearity Y' or X' of each line using following Equations 9, 10 or 11;

$$r_a = \frac{I_a}{[1 + (M_a)^2]^{0.5}} \quad \text{Equation 9}$$

$$Y' = \frac{y - M_{90 \text{ or } 92} x}{[1 + M_{90 \text{ or } 94}^2]^{0.5}} \quad \text{Equation 10}$$

$$X' = \frac{x - M_{92 \text{ or } 96} y}{[1 + M_{92 \text{ or } 96}^2]^{0.5}} \quad \text{Equation 11}$$

determining the squarenes (S) of each corner using following Equation 11;

$$S = \frac{M_a + M_b}{1 - M_a M_b} \quad \text{Equation 11}$$

13. The method as set forth in claim 12 wherein the sheet is a glass sheet.

14. An apparatus for determining peripheral edge characteristics of a discrete sheet having a reflective surface comprising:

means for directing at least one energy beam toward an inspection position to generate a scan path;

means for moving the scan path and a sheet to be studied relative to one another;

means for sensing energy beams from the inspection position;

means cooperating with said sensing means to generate a plurality of signals to simulate a discrete continuous linear scanning path and points of intersection between the peripheral edge portion of the sheet and the scan path; and means for acting on at least the intersection point to determine peripheral edge characteristics of the sheet.

15. The method as set forth in claim 14 wherein said directing means includes a plurality of light generating means mounted relative to one another to provide linear substantially continuous scan portions.

16. The apparatus as set forth in claim 15 wherein said moving means includes means for moving the sheet through the inspection position along a movement path and means for mounting said light generating means to provide the scan portions at an oblique angle to the movement path.

17. The apparatus as set forth in claim 14 wherein said sensing means includes a linear photodetector having discrete photosensitive devices.

* * * * *